United States Patent [19]

Ewen et al.

[11] 4,374,210

[45] Feb. 15, 1983

[54] POLYUREA-POLYURETHANE FROM A MIXTURE OF A POLYOL, AN AROMATIC DIAMINE, AND AN ISOCYANATE-TERMINATED PREPOLYMER

[75] Inventors: James H. Ewen; Thomas R. McClellan, both of Seabrook; Michael H. McMillin, Pasadena; Pat L. Murray, Baytown, all of Tex.

[73] Assignee: The Upjohn Company, Kalamazoo, Mich.

[21] Appl. No.: 303,217

[22] Filed: Sep. 18, 1981

[51] Int. Cl.$^3$ .............................................. C08G 18/14
[52] U.S. Cl. ..................................... 521/159; 521/51; 528/64
[58] Field of Search ...................... 521/159, 51; 528/64

[56] References Cited

U.S. PATENT DOCUMENTS 3,428,610  2/1969  Klebert ................................ 528/64
4,218,543  8/1980  Weber et al. ......................... 521/51
4,298,701  11/1981 Meyborg et al. ..................... 521/51

FOREIGN PATENT DOCUMENTS 19232  11/1980  European Pat. Off. .

OTHER PUBLICATIONS

Frisch et al., (Ed.), *Advances in Urethane Sci. & Technology*, Technomic, Westport, Conn., vol. 4, 1976, pp. 134 and 135.

*Primary Examiner*—Maurice J. Welsh
*Attorney, Agent, or Firm*—Denis A. Firth; John Kekich

[57] ABSTRACT

The use of certain prepolymers of 4,4'-methylenebis(phenyl isocyanate), in place of the latter diisocyanate itself in the preparation of polyurethane-polyureas using aromatic diamine extenders, has a number of advantages particularly when the compositions are prepared by reaction injection molding techniques using two streams of reactants. The principal advantages are (i) a useful increase in gel time and (ii) a ratio of amounts of the two reactant streams which more nearly approaches 1:1.

This latter factor not only improves the efficiency of mixing of the components in the mixing head but, together with the longer gel time, significantly increases the output of mixed reactants per unit of time. The prepolymers of 4,4'-methylenebis(phenyl isocyanate) employed to achieve the above results are those derived from polyoxyethylene polyoxypropylene polyether diols and triols (MW=1000–10,000), polytetramethylene glycols (MW=600–5,000) and polyester diols and triols (MW=500–8,000).

20 Claims, No Drawings

POLYUREA-POLYURETHANE FROM A MIXTURE OF A POLYOL, AN AROMATIC DIAMINE, AND AN ISOCYANATE-TERMINATED PREPOLYMER

BACKGROUND OF THE INVENTION

1. Field of the Invention

This invention relates to the preparation of polyurethane-polyurea compositions and is more particularly concerned with improvements in a process of preparing polyurethane-polyureas by reaction of organic polyisocyanates, polyols and aromatic diamine extenders and with the compositions so prepared.

2. Description of the Prior Art

U.S. Pat. No. 4,218,543 provides a comprehensive review of the prior art relating to the preparation of polyurethane-polyureas by the reaction of organic polyisocyanates, polymeric polyols and various polyamine extenders and said review is incorporated herein by reference. The same patent also describes a significant advance in the art by teaching how to make this type of composition using reaction injection molding (RIM) techniques. The key factors in the method there described are the choice of a particular group of aromatic diamines as the extender and the use of a "one-shot" procedure, i.e. a procedure in which the organic polyisocyanate, polymeric polyol and amine extenders are brought together simultaneously and allowed to react, as opposed to a "prepolymer" procedure in which two or more of the reactants are prereacted before being brought into contact with the remainder of the reactants.

The particular aromatic diamines targeted by the above reference are those aromatic diamines having alkyl groups in both positions ortho to one amino group and in at least one of the positions ortho to the second amino group. A particularly preferred group of aromatic diamines is represented by 1-methyl-3,5-diethyl-2,4-diaminobenzene, 1-methyl-3,5-diethyl-2,6-diaminobenzene and mixtures thereof. These compounds are those derived by diethylation of 2,4- and or 2,6-toluenediamine or mixtures thereof and are generally referred to by the initials "DETA."

The reference also requires that the organic polyisocyanate be 4,4'-methylenebis(phenyl isocyanate) or liquid modifications thereof derived by reacting the diisocyanate with a minor amount of a low molecular weight diol or by converting a portion of the diisocyanate to carbodiimide in accordance with known procedures; see the above cited U.S. Pat. No. 4,218,543 at Column 7, lines 17–28.

The method of the reference provides a means of producing polyurethane-polyureas by a RIM type process using reaction mixtures which have gel times of as low an order as about 3 seconds but which, in spite of the shortness of the latter time, can still be employed to fill complicated mold cavities having a relatively large volume. Further, the physical properties, including structural strength properties, of the resulting moldings are generally excellent.

We have found, however, that the use of the one-shot procedure described in the reference has an inherent disadvantage which arises from the need to maintain the diisocyanate separate from the polymeric polyol and the diamine extender and to feed the diisocyanate as a separate stream to the mixing head, the second stream comprising a mixture of the polymeric polyol and diamine. Since the equivalent weight of the diisocyanate is much lower than that of the polymeric polyol the proportion by weight in which the diisocyanate stream and the combined polyol and diamine stream are brought together in the mixing head is substantially less than equal, the diisocyanate stream proportion being only approximately one-half of that of the other stream. As will be obvious to one skilled in the art, it is generally desirable that the two streams being fed to the high pressure mixing heads used in RIM processing be mixed in substantially equal amounts by volume in order to achieve the maximum output per unit of time from the RIM head. In view of the above noted restriction on the relative amounts in which the two streams are to be mixed in the one-shot process discussed above, it is apparent that there is a significant limitation built into the maximum output of mixed reactants which can be derived by the process in question. This limitation on output, when taken together with the very short gel times of the reaction mixture produced, places very severe limits on the total weight of reactants which can be introduced into any given mold using the process of the reference. This translates into a clear limit on the size of any article which can be produced in a single shot using the process.

We have now found that these various limitations can be overcome by utilizing the diisocyanate in the form of certain prepolymers formed from certain polymeric polyols. As will be apparent from the detailed disclosure below, this enables one to achieve a RIM process in which the two streams being fed to the mixing head are mixed in a wide range of proportions including close to equal proportions, thereby enabling one to operate at much higher outputs per unit time than is the case with the reference procedure. Further, it is found that the use of the prepolymer perceptibly increases the gel time of the reaction mixes and permits a greater degree of latitude to the operator than is available using the extremely short reaction times which characterize the one-shot procedure.

Our findings are all the more unexpected in view of the previous experience in the use of aromatic diamines as extenders for isocyanate-terminated prepolymers. U.S. Pat. No. 3,428,610 discloses the preparation of cross-linked polyurethanes by reaction of isocyanate-terminated prepolymers with the very same class of aromatic diamines which the aforesaid U.S. Pat. No. 4,218,543 indicates is the preferred class for use in the one-shot procedure discussed above. However, the U.S. Pat. No. 3,428,610 patent reports processing times varying over a range between 3 and 45 minutes, all of which would be unacceptable in a RIM procedure operated commercially. In contrast, utilizing the particular prepolymers and procedures described below, we have found that gel times as low as 2.5 seconds can be achieved.

SUMMARY OF THE INVENTION

This invention comprises an improved process for the production of polyurea-polyurethane moldings by the reaction of an organic polyisocyanate with a polyol and an aromatic diamine wherein at least one of the positions ortho to each of the amino groups is substituted by lower-alkyl, in the presence of a catalyst for the reaction between hydroxy groups and isocyanato groups, wherein the improvement comprises employing as the organic polyisocyanate an isocyanate-terminated prepolymer derived by reaction of 4,4'-methylenebis(phenyl isocyanate) with a polyol having a functionality from 2 to 3 selected from the class consisting of copolymers of ethylene oxide and propylene oxide having molecular weights from about 1000 to about 10,000, polytetramethylene glycols having molecular weights from about 600 to about 5000 and polyester polyols having molecular weights from about 500 to 8,000, said polyol and said polyisocyanate being reacted in the proportion of about 0.01 equivalents to about 0.5 equivalents of said polyol per equivalent of said isocyanate.

The invention also comprises polyurea-polyurethane moldings prepared in accordance with the above process.

The term "lower-alkyl" as used in this specification and the claims appended hereto means alkyl having from 1 to 6 carbon atoms, inclusive, such as methyl, ethyl, propyl, butyl, pentyl, hexyl and isomeric forms thereof.

DETAILED DESCRIPTION OF THE INVENTION

The improved process of the invention can be carried out using conventional techniques in the art and employing any standard equipment, including mixing apparatus and molding equipment, which will tolerate the relatively low reaction times involved in the process. These reaction times can vary from as low as 2.5 seconds for gel time up to 7.0 seconds or even higher, depending on factors which will be discussed below. The process of the invention is especially adapted for use in reaction injection molding techniques but can also be applied to other situations, such as spray applications and casting applications, in which the components are dispensed using high pressure mixing equipment. While the discussion below will be directed mainly to the preferred applications in reaction injection molding techniques, it is to be understood that the same considerations will apply to other situations such as those mentioned above.

The key to the advantages which are to be derived from the use of the process of the invention lies in the employment of a particular series of prepolymers as the isocyanate component of the reaction mixture. The isocyanate-terminated prepolymers in question are reacted with a mixture of a polymeric polyol and a diamine in the presence of a catalyst for the reaction between isocyanate groups and active hydrogen-containing groups. In the present state of the art of high pressure mixing heads, such as those currently used for reaction injection molding techniques, it is conventional to employ two streams which are introduced and caused to mix by impingement under high pressure. One of these streams is that comprising the isocyanate-terminated prepolymer in the present invention and this stream is generally designated Stream A. The other stream is a blend of the polyol and the diamine plus the catalyst together with any of the other conventional additives normally employed in making compositions of the type in question. The two streams are brought together in such proportions that the ratio of equivalents of isocyanate in Stream A and to the total equivalents of active hydrogen containing groups in Stream B is within the range of about 0.8:1 to about 1.3:1.

As will be apparent to one skilled in the art, the above range of proportions by equivalents can encompass a wide range of proportions by weight depending on the equivalent weights of the various components involved. In practice it is found that the range of proportions by weight of Stream A to Stream B can vary over a wide range from about 0.4:1 to about 2.5:1. However, the most desirable range of proportions when using reaction injection molding equipment is substantially equal proportions by weight since this enables one to produce maximum output of total reactants in a given time. If one of the two streams is employed in a proportion less than equal to the proportion of the other, the maximum output of components which can be achieved is considerably reduced. Further, as will be explained in more detail later, if the reactivity of the reaction mixture is of a very high order, the maximum amount of reactant which can be dispensed before filling of the mold has to be discontinued is also severely limited. In the present case it is possible to achieve a wide range of reaction times depending on the particular application being considered and this, taken together with the ability to use the reaction streams in relatively equal proportions by weight, considerably increases, and gives a greater degree of latitude to, the amount of material which can be dispensed into a given mold.

The prepolymers which are employed in the process of the invention are those which are derived from 4,4'-methylenebis(phenyl isocyanate) by reaction with less than a stoichiometric amount of a polyether or polyester diol or triol of the type defined above. Advantageously, the proportion of the polyol to polyisocyanate employed in preparing the prepolymer is within the range of about 0.01 to about 0.5 equivalents of polyol per equivalent of polyisocyanate and, preferably, is within the range of about 0.015 to about 0.25 equivalents per equivalent of polyisocyanate. This results in the production of prepolymers having isocyanate contents in the range of about 9 to about 20 percent in the case of the broadest range of proportions and within the range of about 12 to about 16 percent in the case of the preferred range.

The production of the prepolymer is carried out in accordance with well-known techniques. Illustratively, the diisocyanate and the polyol are brought together by any convenient means and in appropriate apparatus and are heated together at a temperature within the range of about 60° C. to about 80° C., advantageously under an atmosphere of inert gas such as nitrogen, until the reaction is determined to be complete as determined by routine analyses for isocyanate content carried out on aliquots of the reaction mixture or by other suitable analytical techniques.

In an optional, but preferred, embodiment of the invention the formation of the prepolymer is carried out using any of the above-identified polyols in combination with a minor amount of a low molecular weight glycol such as dipropylene glycol, tripropylene glycol, polypropylene glycols of molecular weight up to about 425, N,N-di(2-hydroxypropyl)aniline, and the like including mixtures of two or more such glycols. Preferably the low molecular weight glycol has a molecular weight which does not exceed about 425. By "minor amount" is meant an amount which is less than about 20 percent by weight based on total weight of polyol and low molecular weight glycol. Preferably the amount of low molecular weight glycol employed is less than about 16 percent by weight based on the total weight of polyol plus glycol. The upper limit on the amount of the glycol employed is dictated by the consideration that the use of the glycol results in a significant increase in viscosity of the isocyanate prepolymer. Amounts of glycol in excess of those discussed above generally serve to render the viscosity of the prepolymer too high to be useful in the reaction injection molding process of the invention.

The prepolymer obtained as described above can be used as such in the reaction injection molding process of the invention and in this case it advantageously has a viscosity which lies in the range of about 500 cps to about 2500 cps and preferably in the range of about 800 cps to about 2000 cps.

In an optional, but preferred, embodiment of the invention the prepolymer so obtained is blended with a minor amount of a liquefied form of 4,4'-methylenebis(phenyl isocyanate). The latter types of diisocyanate are those well-recognized in the art which have been treated to make them stable liquids at temperatures of about 15° C. or higher. Such compositions include the carbodiimide-containing 4,4'-methylenebis(phenyl isocyanates) having isocyanate equivalents of from about 130 to about 180 prepared, for example, by heating 4,4'-methylenebis(phenyl isocyanate) with a carbodiimide catalyst to convert a portion of said isocyanate to carbodiimide in accordance with U.S. Pat. No. 3,384,653. The compositions also include methylenebis(phenyl isocyanates) which have been reacted with minor amounts (from about 0.04 to 0.2 equivalents per equivalent of isocyanate) of low molecular weight glycols as described for example in U.S. Pat. Nos. 3,394,164; 3,644,457; 3,883,571; and 4,031,026.

The amount of such liquid forms of methylenebis(phenyl isocyanate) employed in making the blends is generally less than about 20 percent by weight and preferably is less than about 12 percent by weight. The actual amount used in any particular instance depends largely on the viscosity required in the resulting blend. Advantageously, the blending is carried out in order to achieve a final viscosity in the blend in the range of about 800 cps to about 2000 cps.

Illustrative of the polymeric polyols which can be employed in preparing the above prepolymers are polyoxyethylene polyoxypropylene diols and triols having molecular weights in the stated range and obtained by the chemical addition of ethylene oxide and propylene oxide, together or sequentially, to di- or trifunctional initiators such as water, propylene glycol, dipropylene glycol, glycerol, trimethylolpropane and the like; polytetramethylene glycols having molecular weights in the stated range; vinyl reinforced polyoxyethylene polyoxypropylene diols and triols obtained by polymerizing styrene, acrylonitrile, and like polymerizable monomers in the presence of the polyoxyethylene polyoxypropylene polyether; polyesters having molecular weights within the stated range and derived by reaction of the appropriate di- or tri-basic carboxylic acid (or anhydride) such as succinic, adipic, suberic, azelaic, phthalic, isophthalic, trimellitic and tetrahydrophthalic acids with the appropriate dihydric alcohol such as ethylene glycol, propylene glycol, butanediol-1,4, hexanediol-1,2, neopentyl glycol, and the like; and polycaprolactones having molecular weights within the stated range.

The preferred polyols for use in the preparation of the prepolymers are polyoxyethylene polyoxypropylene diols having molecular weights in the range of about 1800 to about 10,000 and most preferably in the range of about 2500 to about 5000.

In carrying out the process of the invention as it applies to reaction injection molding the above prepolymers or blends of said prepolymers with minor amounts of liquid forms of methylenebis(phenyl isocyanate), are employed as Stream A. Stream B comprises a mixture of an aromatic diamine and a polymeric polyol. The aromatic diamines are those which have at least one alkyl group in an ortho position to each of the two amino groups and in the preferred class of diamines all of the positions ortho to each amino group are substituted by lower-alkyl.

Illustrative, but not limiting, of the aromatic diamines used in accordance with the present invention are 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene (and mixtures of the latter two diamines in varying proportions), and the like; 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, and the like; 3,3',5,5'-tetramethyl-benzidine, 3,3',5,5'-tetraisopropyl-benzidine, and the like; 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2', 4-diaminodiphenylmethane, 3,5-diisopropyl-3'-methyl-2', 4-diaminodiphenylmethane, 3,3'-diethyl-2,2'-diaminodiphenylmethane, and the like; 3,3',5,5'-tetraethyl-4,4'-diaminobenzophenone, 3,3',5,5'-tetraisopropyl-4,4'-diaminobenzophenone; 3,3',5,5'-tetraethyl-4,4'-diaminodiphenyl ether, 3,3',5,5'-tetraisopropyl-4,4'-diaminodiphenyl ether; 3,3',5,5'-tetraisopropyl-4,4'-diaminodiphenyl sulfone, and the like.

Preferably, the aromatic diamines employed in the process of the invention are selected from 1-methyl-3,5-diethyl-2,4-diaminobenzene, 1-methyl-3,5-diethyl-2,6-diaminobenzene, and the products obtained by condensing a substituted aniline of the formula (I) set forth below or a mixture of two or more such substituted anilines, with formaldehyde under acid conditions to obtain substituted diaminodiphenylmethanes having the formula (II):

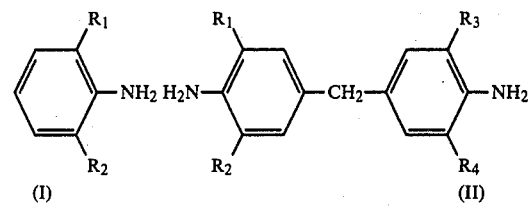

wherein $R_1$ and $R_3$ are selected from hydrogen and lower-alkyl and $R_2$ and $R_4$ are lower-alkyl. If one uses only a single substituted aniline (I) to prepare (II) the groups $R_1$ and $R_3$ will be identical and so will $R_2$ and $R_4$. If one uses two differently substituted anilines in the above reaction the product will be a mixture of a number of different methylenedi(anilines) all conforming to the formula (II).

The polyols which are employed in combination with the aromatic diamines in Stream B have molecular weights within the range of about 1800 to about 10,000 and can be any of the polyols previously employed in the art having functionalities from about 2 to about 4. The choice of polyol to be used in any given formulation will depend on the specific polymer properties required in the end-product. Generally speaking, the preferred functionality is from about 2 to about 3 and the preferred molecular weight range is from about 3000 to about 10,000, most preferably from about 4000 to about 8000.

Illustrative, but not limiting, of the classes of polyols which can be used are the polyoxyalkylene polyethers; polyester polyols; polyol adducts derived from reaction of propylene oxide with a mixture of methylenedianiline and polymethylene polyphenylamines (in accordance, for example, with U.S. Pat. No. 3,423,344); polyols obtained by the Mannich condensation of a phenolic compound with formaldehyde and an alkanolamine, followed by reaction with propylene oxide (in accordance, for example, with U.S. Pat. No. 3,297,597); vinyl reinforced polyether polyols, e.g. those obtained by the polymerization of styrene or acrylonitrile in the presence of the polyether; polyacetals prepared from glycols such as diethylene glycol and formaldehyde; polycarbonates, for example those derived from reaction of butanediol with diarylcarbonates; polyester amides; the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the propyleneoxy-polyethyleneoxy capped diols and triols obtained by the reaction of ethylene and propylene oxides, together or sequentially using as initiator water, ammonia, ethylene glycol, propylene glycol, trimethylolpropane, aniline, ethanolamine, and the like; the polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene and polyoxyalkylene ester diols or copolymers thereof; and the vinyl-resin reinforced propyleneoxy-ethyleneoxy capped diols and triols, particularly those polyethers reinforced with polyacrylonitrile.

A particularly preferred group of polyols to be employed in Stream B are the vinyl-resin reinforced propyleneoxy-ethyleneoxy capped diols and triols.

The proportions within which the aromatic diamine and the polyol can be employed in Stream B can vary over a wide range provided that the ratio in which Stream A and Stream B are mixed in such that the overall ratio of active hydrogen groups in Stream B lies within the range of about 0.8 to about 1.3 equivalents per equivalent of polyisocyanate in Stream A. Preferably the proportion of diamine to polyol in Stream B is such that, in the ultimate reaction mixture, the ratio of equivalents of aromatic diamine per equivalent of polyisocyanate is within the range of about 0.5:1 to about 0.95:1 and preferably within the range of about 0.7:1 to about 0.9:1.

In addition to the prepolymer, the polyol and the aromatic diamine employed in the process of the invention, there is also employed a catalyst for the reaction between hydroxyl groups and isocyanate groups. Generally speaking, this catalyst is introduced by incorporating it in the B stream when operating using the RIM process.

Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963; pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of catalyst employed in any given situation will depend upon the nature of the other components of the mixture and the desired reaction times. Generally speaking, the catalyst is employed within a range of about 0.01 percent by weight to about 5 percent by weight and preferably from about 0.02 to about 3 percent by weight based on total weight of the reaction mixture.

By appropriate selection of the combination of reactants in a particular system as well as the proportions of the reactants, it is possible to obtain reaction times, in particular, gel times which can vary over a range from as low as about 2.5 seconds to as high as about 7.5 seconds. Preferably, the combination of reactants and the proportions in which they are employed is chosen, generally by a process of trial and error, so that the gel time of the resulting reaction mixture is in the range of about 2.75 seconds to about 6.0 seconds, and most preferably in the range of about 3.0 seconds to about 4.5 seconds. The range of gel times which is possible using the process of the present invention represents a marked advantage over the much shorter gel times which are characteristic of the one-shot procedures set forth in U.S. Pat. No. 4,218,543.

In addition, the process of the invention permits one to use a much wider range of proportions by weight of Stream A to Stream B in a RIM type reaction or in any other type of processing procedure involving high-pressure mixing which can accommodate the above range of gel times. Thus, the proportion of the prepolymer to the combination of diamine and polyol employed in the reaction mixture can be varied by appropriate adjustment of one or more of various factors. These factors include adjustment of the isocyanate content of the prepolymer; the higher the isocyanate content of the prepolymer, the greater will be the proportion of active hydrogen containing materials in the combination of polyol and diamine which will be necessary to achieve the desired ratio of isocyanate to active hydrogen groups within the ranges set forth previously. Other factors obviously are the molecular weight of the polyol, the molecular weight of the diamine, and the proportions in which the diamine and polyol are present within the reaction mixture.

In a particularly desirable mode of operation of a RIM process the proportions by weight of Stream A and Stream B are substantially equal. This permits the machine to be operated, if desired, at its maximum rate of output for both streams.

To illustrate the advantages of being able to operate at maximum output of a machine with streams having higher, i.e. longer gel times, the following example may be considered. Using a machine which is capable of feeding and mixing two streams at a rate for each stream of 10 lbs. per minute, it will be apparent that, if both streams are mixed in equal proportions, it is possible to operate at a total output rate of 20 lbs/minute of mixed reactants.

However, if one must operate one stream at a rate which is only 50 percent of the maximum, then the total output of the machine will be only 15 lbs/minute. If, further, the reaction mixture produced has a gel time of, for example, 5 seconds, it will only be possible to mix and pour for a total of 4 seconds. This would enable one to pour a total of 1.33 pounds where both streams are operated at maximum rate but only 1 pound where one component is utilized at half the rate of the other component. If the gel time is now increased from 5 seconds to 10 seconds, the "safe" period for a pour would now be 8 seconds. This would permit the total weight of material dispensed to be increased to 2.66 pounds in the case of mixing of equal proportions and 2 pounds in the case of the lower proportion of one side versus the other. Both of these amounts represent substantial increase over the amount (1 pound) which can be dispensed using the unequal ratio of components and the lower reaction time.

It will, therefore, be seen that the advantages of the longer reaction times which are permitted in accordance with the process of the invention and the higher output, permitted by the greater flexibility in proportions of components, are cumulative in terms of operation of the process.

In addition to the reaction components discussed above which are employed in the process of the invention there can be present, generally in the Stream B when operating in accordance with a RIM procedure, other optional additives such as dispersing agents, surfactants, flame retardants, pigments, reinforcing agents, fibers, and the like in accordance with procedures well-known in the art.

The process of the invention is generally used to prepare non-cellular polyurethane-polyurea moldings. However, it is also possible to utilize the process of the invention to prepare microcellular or cellular moldings by the incorporation of blowing agents into the reaction mixture. The blowing agent may be incorporated into either of the streams employed in a RIM type process in appropriate amounts depending on the required density of the resulting molding. Any of the blowing agents known in the art can be employed including water and volatile inert organic liquids, preferably those having boiling points in the range of about 22° C. to about 35° C. Illustrative of such liquids are butane, hexane, heptane, methylene chloride, chloroform, monofluorotrichloromethane, chlorodifluoromethane, dichlorodifluoromethane and the like. The blowing agents employed may also include compounds which decompose at temperatures above room temperature to liberate gas such as nitrogen. Examples of such compounds are azo compounds and, more particularly, azoisobutyric acid nitrile.

The polyurethane-polyureas produced in accordance with the process of the invention are characterized by excellent structural strength properties such as impact strengths, tensile, hardness, heat resistance, modulus, and tear strength. The polyurethane-polyureas produced in accordance with the invention find a wide range of utility particularly in the molding of auto parts such as car bumpers, body elements, panels, doors, engine hoods, skirts, air scoops and the like. As pointed out previously, the reaction times and the proportions in which the reactants can be brought together in accordance with the present invention are clearly manifest when the process of the invention is employed to prepare moldings such as those set forth above.

The following examples describe the manner and process of making and using the invention and set forth the best mode contemplated by the inventors of carrying out the invention but are not to be construed as limiting.

EXAMPLE 1

Preparation of prepolymers

A charge of 52.8 parts by weight (0.42 equiv.) of 4,4'-methylenebis(phenyl isocyanate) (4,4'-MDI) was heated under an atmosphere of nitrogen at 110°–120° F. with stirring while a total of 5.87 parts by weight (0.082 equivs.) of a mixture of equal parts by weight of dipropylene glycol (DPG) and tripropylene glycol (TPG) was added followed by 31.33 parts by weight (0.018 equivs.) of a polyoxyethylene polyoxypropylene diol (Polyol SF-4005: Texaco Chemical; molecular weight=3500). After the addition was complete, the temperature of the mixture was raised to 175° to 185° F. and maintained thereat with stirring under an atmosphere of nitrogen for 2 hours. At the end of this time an aliquot was removed from the reaction mixture and found to have an isocyanate equivalent of 281.8. The reaction mixture was then cooled to approximately 140° F. and 10 parts of a liquid form of 4,4'-methylenebis(phenyl isocyanate) in which a portion of the isocyanate had been converted to carbodiimide [isocyanate equivalent 143: prepared as described in U.S. Pat. No. 3,384,653] was added with stirring. Agitation was continued for 30 minutes after addition was complete and the mixture was then allowed to cool to room temperature (circa 20° C.). The prepolymer blend so obtained was found to have an isocyanate equivalent of 252 and viscosity at 25° C. of 1825 centistokes. This prepolymer is referred to hereafter as Prepolymer A. Similarly using the above procedure but omitting the mixture of di- and tripropylene glycol in certain instances, there were prepared a series of prepolymers using the reactants and proportions (all parts by weight) set forth in Table I below. In all cases the prepolymers were blended, in the final step described above, with 10 parts by weight of the liquid form of 4,4'-methylenebis(phenyl isocyanate) described above, before cooling to room temperature. The isocyanate equivalent and the viscosity of the resulting blends are also recorded in Table 1.

TABLE 1

| Pre-polymer | 4,4'-MDI | DPG/TPG (1:1) | Polyol:Parts | I.E. | Viscosity at 25° C. (centistokes) |
|---|---|---|---|---|---|
| B | 52.8 | 5.87 | SF4005:31.33 | 250 | 1700 |
| C | 43.58 | 4.85 | SF4005:41.57 | 300 | 2604 |
| D | 45.8 | 5.1 | E2105[1]:39.1 | 300 | 6594 |
| E | 43.1 | 4.8 | 55-28[2]:42.1 | 300 | 2541 |
| F | 43.9 | 4.9 | PPG3025[3]:41.2 | 300 | 2904 |
| G | 36.72 | — | SF3950[4]:53.28 | 300 | 1352 |
| H | 36.09 | — | SF6503[5]:53.91 | 300 | 1393 |
| I | 39.24 | — | 1037-55[6]:50.76 | 300 | 6487 |
| J | 39.24 | — | E2105:50.76 | 300 | 619 |
| K | 39.24 | — | 55-56[7]:50.76 | 300 | 954 |
| L | 54.5 | 6.1 | ECFL4504[8]:29.4 | 250 | 1768 |
| M | 54.5 | 6.1 | 4480-22[9]:29.4 | 250 | 2972 |
| N | 52.6 | 5.8 | 14-28[10]:31.6 | 250 | 4748 |
| O | 44.1 | — | D-440[11]:45.9 | 250 | 705 |
| P | 48.05 | 2.53 | 24-32[12]:39.42 | 250 | 1155 |
| Q | 53.0 | — | SF4005:31.00 | 197.3 | 180 |

Footnotes to Table 1
[1] Polyoxyethylene polyoxypropylene diol; MW = 2000; Texaco Chemical.
[2] Polyoxyethylene polyoxypropylene diol; MW = 4000; Olin.
[3] Polyoxypropylene glycol; MW = 3000; Union Carbide.
[4] Polyoxypropylene polyoxyethylene polyol; MW = 3500; Texaco.
[5] Polyoxyethylene polyoxypropylene triol; MW = 6500; Texaco Chemical.
[6] Ethylene butylene adipate polyester diol; MW = 2000; Hooker.
[7] Polyoxyethylene polyoxypropylene diol; M.W. = 2000; Olin.
[8] Polyoxypropylene glycol capped with ethylene oxide (E.O.); MW = 2040; Witco.
[9] Polyoxypropylene glycol capped with E.O.; MW = 4000; Witco.
[10] Polyoxypropylene glycol capped with E.O.; E.W. = 2000; Union Carbide.
[11] Polyoxypropylenetriol capped with E.O. grafted with 20 percent polyacrylonitrile; MW = 6000; Union Carbide.
[12] Polyoxypropylene polyoxyethylene diol grafted with polystyrene/polyacrylonitrile; MW = 3500; Union Carbide.

EXAMPLE 2

A series of samples of polyurethane-ureas was prepared from Prepolymer A (see Example 1) using a Cannon HF-10 RIM machine capable of delivering 125 lbs. per minute of each of the two reactant streams. The mold size used in all cases was 20"×38"×0.125". The Prepolymer A was the single component representing Stream A. Stream B was obtained by blending the following ingredients in the proportions stated below (all parts by weight).

Stream B

Polyol D-440 (see Footnote 11, Ex. 1): 50.16 parts
DETDA[1]: 11.03 parts
Dimethyl tin dialcoholate[2]: 0.05 parts 1: Approximately 80/20 percent by weight mixture of 1-methyl-3,5-diethyl-2,4-diaminobenzene and 1-methyl-3,5-diethyl-2,6-diaminobenzene, respectively; Ethyl Corporation.
2: UL-28: Witco Chemical Corporation.

A total of 9 samples was prepared utilizing different ratios of Stream A:Stream B as shown by the index in Table 2 below. Stream A was preheated to 100° F. and Stream B was preheated to 130° F. prior to mixing in all cases and the mold was preheated to 140° F. Demolding was carried out 1.0 minutes after completion of the shot in all cases and each sample was cured at 250° F. for 1 hour prior to being subjected to physical testing. Table 2 records in the case of each sample the proportions in which Streams A and B were mixed as shown by the index, i.e., the ratio of equivalents of isocyanate in Stream A per equivalent of active hydrogen containing groups in Stream B, and the physical properties determined for the molded sample.

In the case of Sample 5 the gel time was determined as 3.5 seconds, the gel time being the time interval between the instant of mixing of the component Streams and the time at which the mixed reactants subsequently changed from a fluid state to a solid (gel) state. The gel time represents the maximum period for which mixed reactants could be dispensed by the RIM machine into the mold without risk of producing a defective molding due to failure of reactants to maintain fluid flow in the mold. (Note: it has been reported, see for example, U.S. Pat. No. 4,218,543 at column 5, lines 8–22 that the shot time, i.e. the time for which material can be injected into a mold, can exceed the gel time but applicants have found that this is not so in actual practice). At the weight ratio of Streams A and B employed to make Sample 5 the maximum output of mixed reactants was 202 lbs./minute. Since the gel time was 3.5 seconds the maximum weight of mixed reactants which could be dispensed into a mold in this period was 11.79 lbs. This latter represents the maximum weight of a molded part which could be prepared safely using the above ratio of Streams A and B.

TABLE 2

| Sample No. | 1 | 2 | 3 | 4 | 5 | 6 | 7 | 8 | 9 |
|---|---|---|---|---|---|---|---|---|---|
| Index | 0.90 | 0.93 | 0.96 | 1.00 | 1.03 | 1.07 | 1.10 | 1.14 | 1.17 |
| Properties | | | | | | | | | |
| Density g/cc | 1.07 | 1.08 | 1.09 | 1.09 | 1.07 | 1.07 | 1.07 | 1.07 | 1.06 |
| Hardness Shore D | 57 | 60 | 62 | 61 | 60 | 63 | 62 | 63 | 62 |
| Tensile Modulus: psi | | | | | | | | | |
| at 100% | 2100 | 2300 | 2400 | 2300 | 2700 | 2700 | 2700 | 2800 | 2800 |
| 200% | 2700 | 3000 | 3200 | 3000 | 3600 | 3600 | 3650 | 3800 | 3800 |
| 300% | 3300 | 3900 | 4300 | 4200 | — | — | — | — | — |
| Ultimate Tensile: psi | 3900 | 4200 | 4400 | 4200 | 4500 | 4800 | 4500 | 4800 | 4700 |
| Elongation at break % | 370 | 330 | 320 | 300 | 280 | 280 | 220 | 280 | 260 |
| Tensile Set % | 100 | 90 | 80 | 80 | 75 | 90 | 80 | 80 | 80 |
| [1]Heat Sag at 250° F.: in. | 0.3 | 0.2 | 0.3 | 0.3 | 0.2 | 0.1 | 0.1 | 0.1 | 0.1 |
| [2]Flexural Modulus: psi | | | | | | | | | |
| −20° F. | 89,041 | 84,715 | 90,737 | 104,424 | 101,562 | 108,907 | 105,382 | 107,692 | 112,901 |
| 75° F. | 41,400 | 35,433 | 33,528 | 40,816 | 42,905 | 41,400 | 46,669 | 47,184 | 46,165 |
| 158° F. | 20,701 | 22,036 | 24,040 | 26,380 | 23,372 | 18,745 | 29,154 | 21,369 | 26,490 |

Footnotes:
[1] Test CT222006AA of General Motors, Chevrolet Division, Flint, Michigan. Value shown is the amount of sag in a sample (1" × 6" × 0.125") exposed to the stated temperature for 60 minutes.
[2] Determined using ASTM Test D-790.

EXAMPLE 3

The following series of experiments was carried out for purposes of comparison and shows the effect of utilizing the process of the prior art by replacing the Stream A utilized in Example 2 by a modified form of 4,4'-MDI which was not a prepolymer and adding to Stream B the polyol which was employed in making the prepolymer of Example 2. A series of 7 samples was prepared utilizing the same procedure as that employed in Example 2 but utilizing an Admiral 2000-2HP RIM machine and varying the proportions of Streams A and B over substantially the same range as was done in Example 2. The isocyanate employed in Stream A in the present example was obtained by reacting 346 parts by weight of 4,4'-MDI with 39 parts by weight of a mixture of dipropylene glycol and tripropylene glycol using the reaction conditions and procedure described in Example 1. The product of this reaction was then blended with 66 parts by weight of the same liquid form of 4,4'-methylenebis(phenyl isocyanate) employed in Example 1 and utilizing the blending procedure there described. The final product was found to have an isocyanate equivalent of 166.

Stream B employed in this example had the following composition (substantially identical to Stream B of Example 1 with the addition of Polyol SF-4005, the polyol used to prepare the prepolymer of Stream A in Example 2):

SF-4005: 15.05 parts by weight
D-440: 48.05 parts by weight
DETDA: 10.57 parts by weight
Dimethyl tin dialcoholate: 0.0737 parts by weight The ratio of the above Streams A and B utilized in making the samples as shown by the index and the physical properties of the cured samples are shown in Table 3. The gel time of the reaction mixture was 2.4 seconds. The maximum output of the mixed reactants at an index of 1.03 was 168.5 lbs/minute and the maximum part weight which could be dispensed using the above gel time and output was 6.74 lbs. which compares very unfavorably with the corresponding figures shown in Example 2.

The tensile modulus, heat sag and flexural modulus values for the samples shown in Example 2 are significantly better than the values for the samples of Example 3 made at the corresponding A/B ratios.

TABLE 3

| Sample No. | 10 | 11 | 12 | 13 | 14 | 15 | 16 |
|---|---|---|---|---|---|---|---|
| Index | 0.93 | 0.96 | 0.99 | 1.02 | 1.05 | 1.08 | 1.11 |
| Properties | | | | | | | |
| Density g./cc. | 1.07 | 1.09 | 1.06 | 1.09 | 1.06 | 1.07 | 1.08 |
| Hardness Shore D | 46 | 50 | 50 | 54 | 57 | 57 | 58 |
| Tensile Modulus: psi | | | | | | | |
| at 100% | 1100 | 1300 | 1400 | 1850 | 1850 | 2100 | 2100 |
| 200% | 1300 | 1600 | 1800 | 2450 | 2550 | 2900 | 2900 |
| 300% | 1450 | 1900 | 2150 | 3150 | 3300 | 3800 | 3900 |
| Ultimate tensile: psi | 1500 | 2450 | 2750 | 4050 | 3800 | 4400 | 4680 |
| Elongation at break: % | 370 | 550 | 470 | 370 | 340 | 350 | 350 |
| Die "C" Tear: pli | 490 | 600 | 560 | 690 | 620 | 730 | 740 |
| Heat Sag at 250° F.: in. | 0.5 | 0.5 | 0.8 | 0.2 | 0.3 | 0.1 | 0.2 |
| Flexural Modulus: psi | | | | | | | |
| −20° F. | 54,875 | 59,085 | 61,798 | 67,179 | 74,635 | 74,460 | 86,956 |
| 75° F. | 12,600 | 16,333 | 17,000 | 25,000 | 23,834 | 27,100 | 26,740 |
| 158° F. | 10,000 | 8,943 | 8,849 | 16,400 | 16,385 | 19,036 | 18,089 |

EXAMPLE 4

A series of 8 samples was prepared using the same Stream A and procedure as described in Example 2 but modifying the composition of the Stream B to reduce the amount of diamine therein and increase correspondingly the amount of polyol. The composition of the Stream B so modified was as follows:

D-440: 58.17 parts by weight
DETDA: 8.72 parts by weight
Dimethyl tin dialcoholate: 0.058 parts by weight.

The admixing of Streams A and B and injection into the mold (20"×38"×0.125") was carried out using an Admiral 2000-2HP RIM machine operating under the same reactant and mold temperature ranges shown in Example 2. The samples were prepared using a wide range of proportions of Streams A and B the details of which and the physical properties of the cured samples are given in Table 4.

The gel time measured in respect of the composition fabricated at an index of 1.05 was 4.3 seconds, the maximum output at that ratio being 186.7 lbs/minute and the maximum part weight capable of being dispensed with the above gel time being 13.38 lbs.

TABLE 4

| Sample No. | 17 | 18 | 19 | 20 | 21 | 22 | 23 | 24 |
|---|---|---|---|---|---|---|---|---|
| Index | 1.00 | 1.05 | 1.10 | 1.15 | 1.20 | 1.25 | 1.30 | 1.35 |
| Properties | | | | | | | | |
| Density, gr./cc. | 1.02 | 1.05 | 1.07 | 1.08 | 1.09 | 1.09 | 1.10 | — |
| Hardness, Shore D | 49 | 52 | 54 | 53 | 52 | 52 | 53 | 53 |
| Tensile Modulus, psi | | | | | | | | |
| at 100% | 1800 | 2000 | 2000 | 2000 | 2100 | 1700 | 1600 | 1600 |
| 200% | 2500 | 2800 | 2800 | 2900 | 3000 | 2300 | 2200 | 2200 |
| 300% | 3200 | 3700 | 3700 | 3900 | 4000 | — | — | — |
| Ultimate Tensile, psi | 3500 | 3800 | 4000 | 4200 | 4200 | 2900 | 2500 | 2500 |
| Elongation, % | 350 | 350 | 350 | 300 | 320 | 288 | 280 | 280 |
| Tensile set, % | 80 | 70 | 70 | 70 | 20 | 55 | 35 | 50 |
| Heat Sag @ 250° F./60 minutes | 0.4 | 0.3 | 0.3 | 0.3 | 0.1 | 0.1 | 0.2 | 0.2 |
| Flexural Modulus, psi | | | | | | | | |
| −20° F. | 52,000 | 49,270 | 53,381 | 54,783 | 60,289 | 57,256 | 69,210 | 64,680 |
| 75° F. | 16,625 | 18,288 | 20,550 | 17,685 | 21,858 | 20,781 | 17,456 | 19,026 |
| 158° F. | 10,260 | 12,141 | 11,980 | 11,053 | 18,883 | 16,188 | 10,665 | 10,799 |

EXAMPLE 5

A series of 8 samples was prepared using the same Stream A and procedure as described in Example 2 but modifying the composition of Stream B to increase the amount of diamine therein and decrease correspondingly the amount of polyol. The composition of the Stream B so modified was as follows:

D-440: 39.90 parts by weight
DETDA: 13.96 parts by weight
Dimethyl tin dialcoholate: 0.04 parts by weight The admixing of Streams A and B and injection into the mold (20″×38″×0.125″) was carried out using a Cannon HF-10 RIM machine operating under the same reactant and mold temperature ranges shown in Example 2. The samples were prepared using a wide range of proportions of Streams A and B the details of which and the physical properties of the cured samples are given in Table 5.

The gel time measured in respect of the composition fabricated at an index of 1.03 was 2.7 seconds, the maximum output at that ratio being 220 lbs/minute and the maximum part weight capable of being dispensed with the above gel time being 9.9 lbs.

TABLE 5

| Sample No. | 25 | 26 | 27 | 28 | 29 | 30 | 31 | 32 |
|---|---|---|---|---|---|---|---|---|
| Index | 0.90 | 0.94 | 0.96 | 0.98 | 1.0 | 1.03 | 1.09 | 1.12 |
| Properties | | | | | | | | |
| Hardness, Shore D | 64 | 65 | 65 | 68 | 68 | 66 | 67 | 70 |
| Tensile Modulus, psi | | | | | | | | |
| at 100% | 2800 | 3100 | 3200 | 3600 | 3700 | 3200 | 3650 | 3700 |
| 200% | 3400 | 3750 | 3900 | 4400 | 4500 | 4000 | 4550 | 4800 |
| 300% | 3800 | 4500 | 4900 | 5600 | — | — | — | — |
| Ultimate Tensile, psi | 4300 | 4750 | 5100 | 5700 | 5600 | 4550 | 5450 | 5700 |
| Elongation, % | 380 | 320 | 300 | 300 | 290 | 220 | 250 | 230 |
| Tensile Set, % | 140 | 120 | 120 | 125 | 120 | 100 | 105 | 105 |
| Die "C" Tear, pli | 980 | 1000 | 1020 | 1100 | 1060 | 990 | 1120 | 1140 |
| Heat Sag @ 250° F./60 minutes | 0.3 | 0.2 | 0.0 | 0.0 | 0.1 | 0.2 | 0.10 | 0.0 |
| Flexural Modulus, psi | | | | | | | | |
| −20° F. | 131,524 | 130,485 | 120,532 | 133,000 | 153,846 | 128,684 | 137,000 | 155,385 |
| 75° F. | 58,650 | 62,215 | 62,000 | 67,595 | 56,000 | 66,198 | 69,230 | 76,923 |
| 158° F. | 30,769 | 37,375 | 34,000 | 39,461 | 42,442 | 35,785 | 42,906 | 39,142 |

EXAMPLE 6

A series of 10 samples was prepared using exactly the procedure described in Example 2 but replacing the Stream B there used by a Stream B having the following composition:

SF 6503: 39.90 parts by weight
DEDTA: 13.96 parts by weight
Dimethyl tin dialcoholate: 0.04 parts by weight.

The machine employed was an Admiral 2000-2HP but otherwise the procedure and reaction conditions were exactly as in Example 2. Table 6 records the proportions of Streams A and B used to make the samples together with the physical properties determined on the cured samples.

The gel time measured in respect of the composition fabricated at an index of 1.02 was 2.9 seconds, the maximum output at that ratio being 230 lbs/minute and the maximum part weight capable of being dispensed with the above gel time being 11.09 lbs.

TABLE 6

| Sample No. | 33 | 34 | 35 | 36 | 37 | 38 | 39 | 40 | 41 | 42 |
|---|---|---|---|---|---|---|---|---|---|---|
| Index | 0.90 | 0.92 | 0.96 | 0.98 | 1.0 | 1.02 | 1.04 | 1.07 | 1.10 | 1.14 |
| Properties | | | | | | | | | | |
| Hardness, Shore D | 51 | 54 | 54 | 55 | 56 | 57 | 57 | 61 | 63 | 61 |
| Tensile Modulus, psi | | | | | | | | | | |
| at 100% | 1300 | 1500 | 1750 | 2000 | 2000 | 2200 | 2300 | 1750 | 2600 | 3200 |
| 200% | 1500 | 1650 | 2100 | 2400 | 2500 | 2800 | 3000 | 3800 | 3600 | — |
| 300% | 1600 | 1850 | 2450 | 7000 | 3100 | 3600 | — | — | — | — |
| Ultimate Tensile, psi | 1800 | 2400 | 3400 | 4000 | 4900 | 4200 | 3850 | 3800 | 3800 | 4208 |
| Elongation, % | 500 | 550 | 500 | 430 | 380 | 360 | 280 | 220 | 200 | 180 |
| Tensile Set, % | 120 | 160 | 130 | 110 | 100 | 90 | 75 | 65 | 60 | 60 |
| Die "C" Tear, pli | 600 | 690 | 730 | 775 | 760 | 740 | 740 | 840 | 810 | 870 |
| Heat Sag @ 250° F./60 minutes | 0.6 | 0.7 | 0.4 | 0.5 | 0.5 | 0.3 | 0.2 | 0.1 | 0.1 | 0.2 |
| Flexural Modulus, psi | | | | | | | | | | |
| −20° F. | 85,385 | 84,615 | 54,405 | 82,000 | 88,272 | 89,248 | 98,524 | 96,154 | 98,456 | 110,932 |
| 75° F. | 28,246 | 29,816 | 32,097 | 34,000 | 33,348 | 35,103 | 35,698 | 42,147 | 43,737 | 45,164 |
| 158° F. | 13,788 | 14,460 | 14,892 | 17,378 | 13,600 | 17,377 | 17,495 | 23,077 | 22,308 | 25,782 |

EXAMPLE 7

A series of 7 moldings was prepared using exactly the procedure, reaction conditions and equipment described in Example 2 but replacing Stream B there used by a Stream B having the following composition:

D-440: 100 parts by weight
[1]MDIFP: 66 parts by weight
Dimethyl tin dialcoholate: 0.2 parts by weight
1: 4,4′-methylenebis(2,6-diisopropylaniline)

Table 7 records the proportions of Streams A and B used to make the samples together with the physical properties determined on the cured samples.

TABLE 7

| Sample No. | 43 | 44 | 45 | 46 | 47 | 48 | 49 |
|---|---|---|---|---|---|---|---|
| Index | .94 | .98 | 1.01 | 1.05 | 1.07 | 1.10 | 1.13 |
| Properties | | | | | | | |

TABLE 7-continued

| Sample No. | 43 | 44 | 45 | 46 | 47 | 48 | 49 |
|---|---|---|---|---|---|---|---|
| Index | .94 | .98 | 1.01 | 1.05 | 1.07 | 1.10 | 1.13 |
| Density, gr./cc. | 1.10 | 1.10 | 1.09 | 1.12 | 1.09 | 1.12 | 1.10 |
| Hardness, Shore D | 67 | 68 | 66 | 70 | 70 | 71 | 72 |
| Tensile Modulus, psi - 100% | 3250 | 3400 | 3550 | 3550 | 3400 | 3500 | 4000 |
| Ultimate Tensile, psi | 3300 | 4500 | 3600 | 3850 | 4400 | 4200 | 4200 |
| Elongation, % | 110 | 230 | 110 | 110 | 200 | 150 | 120 |
| Die "C" Tear, pli | 750 | 800 | 820 | 835 | 790 | 775 | 785 |
| Flexural Modulus, psi | | | | | | | |
| −20° F. | 144,676 | 169,082 | 156,054 | 150,462 | 160,296 | 127,389 | 132,850 |
| 75° F. | 75,228 | 93,612 | 79,410 | 87,277 | 79,006 | 75,000 | 85,875 |
| 158° F. | 43,721 | 43,112 | 42,987 | 47,450 | 42,978 | 44,035 | 47,195 |

EXAMPLE 8

A molding was prepared using the procedure and reaction conditions described in Example 2 but replacing the Stream B there used by a Stream B having the following composition:

[1]Voranol 5148: 100 parts by weight
DETDA: 35 parts by weight
Dimethyl tin dialcoholate: 0.2 parts by weight

[1]: Polyoxypropylenetriol capped with ethylene oxide: MW-7500: Dow Chemical.

The equipment employed was an Admiral 2000 HP RIM machine and the mold dimensions were $12\frac{3}{4}'' \times 14\frac{1}{2}'' \times 0.14''$. The Streams A and B were mixed in a weight ratio of 0.9016:1.00 corresponding to an index of 1.10. The properties of the cured moldings (all properties are an average of six determinations) were as follows:

Density: g/cc.: 1.07
Hardness, Shore D: 59
Tensile modulus, psi
  100%: 2450
  200%: 3375
  300%: 4275
Ultimate tensile, psi: 4600
Elongation %: 290
Die "C" Tear, pli: 691
Flexural modulus, psi
  −20° F.: 72,891
  75° F.: 46,000
  158° F.: 29,228

The machine output under the above conditions was 238 lbs/minute, the gel time was 3.2 seconds and the maximum part weight was 12.7 lbs.

EXAMPLE 9

Using exactly the procedure and equipment described in Example 2 a series of six moldings was prepared using prepolymer Q (prepared as described in Example 1) as Stream A and using a Stream B obtained by blending the following ingredients in the proportions stated (all parts by weight):

Stream B

Polyol D-440: 48.91 parts
DETDA: 10.76 parts
Blend of equal parts of di- and tripropylene glycol: 2.86 parts
Dimethyl tin dialcoholate: 0.0625 parts The above combination of Streams A and B corresponds to that employed in Example 2 except that the mixture of di- and tripropylene glycol is present in Stream B rather than being used in making the prepolymer of Stream A.

Table 8 records the proportions of Streams A and B used to make the moldings together with the physical properties determined for the cured moldings. The gel time for the reaction mixture employed at an index of 1.01 was 2.6 seconds. The maximum possible output of the RIM machine at this ratio was 197.5 lbs/minute. The maximum part weight capable of being dispensed at this index was therefore 8.56 lbs.

TABLE 8

| Sample No. | 50 | 51 | 52 | 53 | 54 | 55 |
|---|---|---|---|---|---|---|
| Index | 0.93 | 0.96 | 0.99 | 1.01 | 1.04 | 1.08 |
| Properties | | | | | | |
| Density g./cc. | 1.08 | 1.10 | 1.09 | 1.08 | 1.07 | 1.08 |
| Hardness Shore D | 55 | 55 | 58 | 56 | 61 | 61 |
| Tensile Modulus, psi | | | | | | |
| at 100% | 2200 | 2100 | 2150 | 2150 | 2300 | 2500 |
| 200% | 3000 | 3000 | 3000 | 3000 | 3250 | 3500 |
| 300% | 4100 | 3900 | — | 4000 | — | — |
| Ultimate Tensile, psi | 4350 | 3900 | 3700 | 4100 | 3500 | 4000 |
| Elongation % | 310 | 300 | 280 | 310 | 220 | 200 |
| Die "C" Tear, pli | 660 | 590 | 550 | 680 | 680 | 690 |
| Heat sag @ 250° F.: in | 0.1 | 0.0 | 0.1 | 0.1 | 0.2 | 0.1 |
| Flexural Modulus, psi | | | | | | |
| −20° F. | 72,319 | 70,814 | 77,546 | 82,740 | 102,608 | 103,896 |
| 75° F. | 24,409 | 26,757 | 26,539 | 20,551 | 25,498 | 30,546 |
| 158° F. | 17,391 | 20,320 | 20,975 | 15,905 | 20,226 | 19,833 |

EXAMPLE 10

This is a comparison example which shows the result of carrying out the production of polyurea-polyurethane elastomers using the "one-shot" process described in the prior art as contrasted with the prepolymer process of the present invention.

A series of samples was prepared using an Admiral 2000-2 HP RIM machine with a mold of dimensions $24'' \times 24'' \times 0.125''$. The operating conditions and temperatures were those described in Example 2. Stream A was a polyisocyanate blend obtained by mixing 4,4'-methylenebis(phenyl isocyanate) with the liquid form of 4,4'-methylenebis(phenyl isocyanate) employed in Example 1 in the ratio of 20.44 parts by weight of the former and 4.19 parts by weight of the latter. Stream B was a blend of the following ingredients in the proportions shown (all parts by weight):

Polyol D-440: 47.49 parts
Polyol SF 4005: 14.86 parts
DETDA: 10.45 parts
Diethylene glycol: 1.39 parts Tripropylene glycol: 1.39 parts
Dimethyl tin dialcoholate: 0.075 parts.

Table 9 records the proportions of Streams A and B used to make the moldings together with the physical properties determined for the cured moldings. The gel time at an index of 1.03 was 1.5 seconds. The maximum output of the RIM machine at this index was 165 lbs/minute but the maximum part weight capable of being dispensed at this index was only 4.1 lbs. which contrasts markedly with the much higher part weights which can be dispensed in accordance with the invention.

TABLE 9

| Sample No. | 56 | 57 | 58 | 59 | 60 | 61 |
|---|---|---|---|---|---|---|
| Index | 0.96 | 0.99 | 1.03 | 1.06 | 1.09 | 1.12 |
| Properties | | | | | | |
| Density, g./cc. | 1.10 | 1.10 | 1.10 | 1.10 | 1.11 | 1.09 |
| Hardness, Shore D | 56 | 54 | 55 | 55 | 57 | 58 |
| Tensile Modulus, psi | | | | | | |
| at 100% | 2200 | 1950 | 2100 | 2200 | 2200 | 2400 |
| 200% | 2950 | 2600 | 2800 | 3000 | 3050 | 3250 |
| 300% | 3900 | 3400 | 3800 | — | — | — |
| Ultimate Tensile, psi | 4100 | 3800 | 3800 | 3650 | 3700 | 3750 |
| Elongation, % | 310 | 350 | 300 | 270 | 250 | 240 |
| Tensile Set, % | 80 | 85 | 75 | 65 | 70 | 60 |
| Die "C" Tear, pli | 650 | 560 | 620 | 630 | 650 | 640 |
| Heat Sag @ 250° F./ 60 min.: in. | 0.2 | 0.2 | 0.0 | 0.0 | 0.1 | 0.2 |
| Flexural Modulus, psi | | | | | | |
| −20° F. | 73,242 | 72,000 | 71,000 | 77,374 | 79,000 | 81,925 |
| R.T. | 25,737 | 28,000 | 27,000 | 25,300 | 26,000 | 31,000 |
| 158° F. | 21,030 | 13,961 | 18,500 | 19,666 | 20,600 | 22,300 |

We claim:

1. In a process for the production of a polyurea-polyurethane by the reaction of an organic polyisocyanate with a polyol and an aromatic diamine wherein at least one of the positions ortho to each of the amino groups is substituted by lower-alkyl, in the presence of a catalyst for the reaction between hydroxy groups and isocyanato groups, the improvement which comprises employing as the organic polyisocyanate an isocyanate-terminated prepolymer having an isocyanate content of about 9 to about 20 percent derived by reaction of 4,4'-methylenebis(phenyl isocyanate) with a polyol having a functionality from 2 to 3 selected from the class consisting of copolymers of ethylene oxide and propylene oxide having molecular weights from about 1000 to about 10,000, polytetramethylene glycols having molecular weights from about 600 to about 5,000 and polyester polyols having molecular weights from about 500 to 8,000, said polyol and said isocyanate being reacted in the proportion of about 0.01 equivalents to about 0.5 equivalents of said polyol per equivalent of said isocyanate.

2. A process according to claim 1 wherein said organic polyisocyanate also comprises a minor amount of a liquefied form of 4,4'-methylenebis(phenyl isocyanate) obtained by heating the latter with a carbodiimide-forming catalyst to convert a portion of said isocyanate to carbodiimide.

3. A process according to claim 1 wherein the organic polyisocyanate also comprises a minor amount of 4,4'-methylenebis(phenyl isocyanate) which has previously been reacted with from about 0.04 to about 0.2 equivalents, per equivalent of said isocyanate, of a diol selected from dipropylene glycol, tripropylene glycol and mixtures thereof.

4. A process according to claim 1 wherein the polyol employed in the preparation of said prepolymer is a polyethyleneoxy-polypropyleneoxy diol having a molecular weight in the range of about 2000 to about 5000.

5. A process according to claim 4 wherein said polyethyleneoxy-polypropyleneoxy diol has a molecular weight of about 3500.

6. A process according to claim 1 wherein said prepolymer has an isocyanate content of about 12 to about 16 percent.

7. A process according to claim 1 wherein said aromatic diamine is selected from the class consisting of 1-methyl-3,5-diethyl-2,4-diaminobenzene, 1-methyl-3,5-diethyl-2,6-diaminobenzene and mixtures thereof.

8. A process according to claim 1 wherein said aromatic diamine comprises 3,3',5,5'-tetraisopropyl-4,4'-diaminodiphenylmethane.

9. A process according to claim 1 wherein said aromatic diamine is the product of the acid condensation of formaldehyde and a mixture of at least two different alkylated anilines of the formula

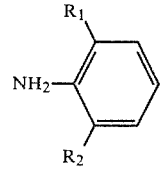

wherein $R_1$ is selected from the class consisting of hydrogen and lower-alkyl and $R_2$ is lower-alkyl.

10. In a process for the production of a polyurea-polyurethane the improvement which comprises utilizing two reaction Streams A and B which are brought together and reacted using a reaction injection molding technique;

said Stream A comprising an isocyanate-terminated prepolymer having an isocyanate content of about 9 to about 20 percent derived by reaction of 4,4'-methylenebis(phenyl isocyanate) with a polyol havng a functionality from 2 to 3 selected from the class consisting of copolymers of ethylene oxide and propylene oxide having molecular weights from about 1000 to about 10,000, polytetramethylene glycols having molecular weights from about 600 to about 5000, and polyester polyols having molecular weights from about 500 to about 8000;

said Stream B comprising a blend of a polyol having a molecular weight from about 1800 to about 10,000, an aromatic diamine wherein at least one of the positions ortho to each of the amino groups is substituted by lower-alkyl, and a catalyst for the reaction between hydroxyl groups and isocyanate groups;

said Streams A and B being reacted in proportions such that the proportions by weight are within the range of about 0.5 to about 1.5 parts of Stream A per part of Stream B and the ratio of isocyanate groups in Stream A to total active hydrogen groups in Stream B is from about 0.8:1 to about 1.3:1.

11. A process according to claim 10 wherrein said Stream A also comprises a minor amount of 4,4'-methylenebis(phenyl isocyanate) which has been previously reacted with from about 0.04 to about 0.2 equivalents, per equivalent of said isocyanate, of a diol selected from dipropylene glycol, tripropylene glycol and mixtures thereof.

12. A process according to claim 10 wherein said Stream A also comprises a minor amount of a liquefied form of 4,4'-methylenebis(phenyl isocyanate) obtained by heating the latter with a carbodiimide-forming catalyst to convert a portion of said isocyanate to carbodiimide.

13. A process according to claim 10 wherein the polyol employed in the preparation of said prepolymer is a polyethyleneoxy-polypropyleneoxy diol having a molecular weight in the range of about 2000 to about 5000.

14. A process according to claim 13 wherein said polyethyleneoxy-polypropyleneoxy diol has a molecular weight of about 3500.

15. A process according to claim 10 wherein said aromatic diamine employed in Stream B is selected from the class consisting of 1-methyl-3,5-diethyl-2,4-diaminobenzene, 1-methyl-3,5-diethyl-2,6-diaminobenzene and mixtures thereof.

16. A process according to claim 10 wherein said aromatic diamine employed in Stream B comprises 3,3',5,5'-tetraisopropyl-4,4'-diaminodiphenylmethane.

17. A process according to claim 10 wherein said aromatic diamine employed in Stream B is the product of the acid condensation of formaldehyde and a mixture of at least two different alkylated anilines of the formula:

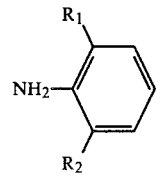

wherein $R_1$ is selected from the class consisting of hydrogen and lower-alkyl and $R_2$ is lower alkyl.

18. A process according to claim 10 wherein said polyol employed in Stream B is a polyol of functionality from 2 to about 4 and having a molecular weight in the range of about 1800 to about 10,000.

19. A polyurethane-polyurea prepared in accordance with claim 1.

20. A polyurethane-polyurea prepared in accordance with claim 10.

* * * * *